(12) United States Patent
Gschweng

(10) Patent No.: US 10,046,725 B2
(45) Date of Patent: Aug. 14, 2018

(54) IGNITION LOCK

(71) Applicant: GM GLOBAL TECHNOLOGY OPERATIONS LLC, Detroit, MI (US)

(72) Inventor: Joerg Gschweng, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/476,589

(22) Filed: Mar. 31, 2017

(65) Prior Publication Data

US 2017/0282830 A1    Oct. 5, 2017

(30) Foreign Application Priority Data

Apr. 1, 2016  (DE) .................. 10 2016 003 981

(51) Int. Cl.
| | |
|---|---|
| *B60R 21/02* | (2006.01) |
| *B60K 35/00* | (2006.01) |
| *E05B 17/22* | (2006.01) |
| *H01H 27/06* | (2006.01) |

(52) U.S. Cl.
CPC .............. *B60R 21/02* (2013.01); *B60K 35/00* (2013.01); *E05B 17/226* (2013.01); *H01H 27/06* (2013.01); *B60K 2350/106* (2013.01); *B60K 2350/108* (2013.01)

(58) Field of Classification Search
CPC .. B60R 21/02; B60K 35/00; B60K 2350/106; B60K 2350/108; E05B 17/226; H01H 27/06

USPC ...................................................... 200/43.04
See application file for complete search history.

(56) References Cited

U.S. PATENT DOCUMENTS

| | | | |
|---|---|---|---|
| 9,403,437 B1* | 8/2016 | McDonald | ............. B60K 35/00 |
| 2004/0201274 A1* | 10/2004 | Rudolph | ................ H01H 27/06 |
| | | | 307/10.1 |
| 2008/0236222 A1 | 10/2008 | Giacomin | |
| 2011/0278139 A1* | 11/2011 | Windeler | ............. H01H 25/065 |
| | | | 200/4 |

FOREIGN PATENT DOCUMENTS

DE    102005045607 B4    2/2009

OTHER PUBLICATIONS

German Patent Office, German Search Report for German Patent Application No. 10 2016 003 981.7 dated Jan. 19, 2017.

* cited by examiner

*Primary Examiner* — Edwin A. Leon
(74) *Attorney, Agent, or Firm* — Lorenz & Kopf, LLP

(57) ABSTRACT

An ignition lock for a motor vehicle includes a locking cylinder, which in the presence of a suitable key can be shifted along a path including a punctual directional change between a driving position and a stationary position. In the driving position the ignition lock allows operation of an engine of the motor vehicle. In the stationary position operation of the engine is blocked. An indicating device is controlled by a switch operable by the locking cylinder at the point of directional change.

16 Claims, 2 Drawing Sheets

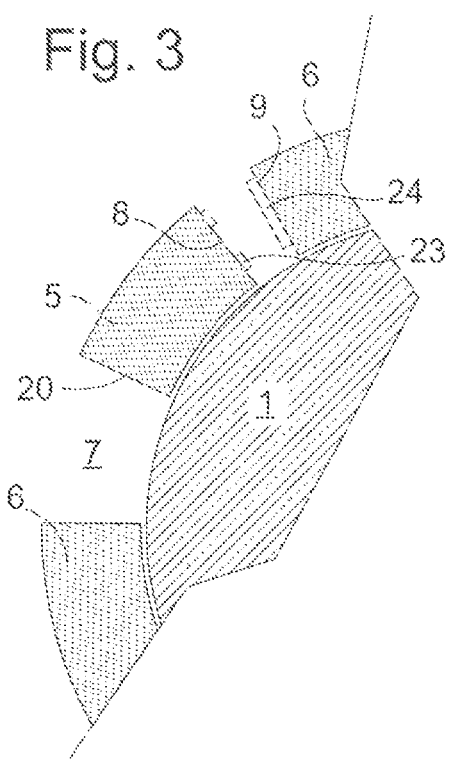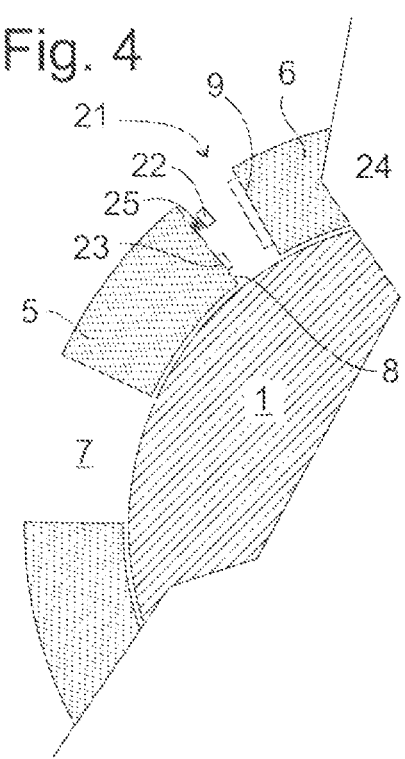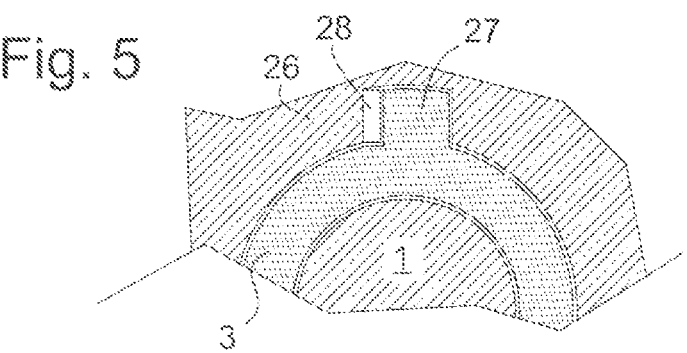

IGNITION LOCK

CROSS-REFERENCE TO RELATED APPLICATION

This application claims priority to German Patent Application No. 102016003981.7, filed Apr. 1, 2016, which is incorporated herein by reference in its entirety.

TECHNICAL FIELD

The present disclosure pertains to an ignition lock for a motor vehicle.

BACKGROUND

For decades, the use of ignition locks in motor vehicles has been known, where a locking cylinder receives a suitable key and is rotatable about an axis between an inactive position, a driving position and an intermediate position. In the inactive position, the key can be withdrawn and the engine and all or nearly all electrical components of the vehicle are switched off. In the operating position, the engine and the electrical components are in operation. In the intermediate position, the electrical components are switched on, but the engine is switched off.

In recent years doubts have arisen as to the safety of ignition lock systems, which permit a changeover from the driving position into the intermediate position, while the vehicle is moving. If such a changeover is triggered without the driver's interference, for example, due to the pendulum action of a bunch of keys in the ignition lock, the risk of an accident my be increased.

Therefore, an ignition lock has been proposed, where operational safety is improved, in that a locking cylinder, in the presence of a suitable key, can be shifted along a path between a driving position, in which the ignition lock permits the operation of an engine of the motor vehicle, and a stationary position, in which the operation of the engine is blocked. The path includes a directional change. Even if accidentally and without any interference from the driver, there were forces impacting the key, which might be suitable to move the same along a first section of this path up to the point of the directional change, it would be very unlikely for the same accidental forces to cause the movement of the key also in the changed direction.

There is, however, the problem that drivers of motor vehicles have always been used to bringing the key into the stationary position by continuously rotating it out of the driving position and then withdrawing the key. With a lock of the above-mentioned kind, however, such a rotation is blocked immediately at the point of the directional change. In this position, the engine is not switched off nor can the key be withdrawn, so that a driver not familiar with the ignition lock is inclined to suspect a functional fault. A functional fault which prevents the engine from being switched off and the key from being withdrawn may be very irritating, since the driver would not be able to exit the vehicle and leave it unattended, in order to call help.

Accordingly, there is a need to provide an ignition lock with improved operational safety, where an irritation of even a driver not familiar with this ignition lock can be safely avoided.

SUMMARY

The present disclosure is directed to an ignition lock for a motor vehicle, in which a locking cylinder, in the presence of a suitable key, can be shifted between a driving position in which the ignition lock allows operation of an engine of the motor vehicle, and a stationary position in which operation of the engine is blocked, along a path including a punctual directional change. An indicating device or display is controlled by a switch operable by the locking cylinder. Because the indicating device reacts when the point of directional change is reached, it can be ensured that the driver perceives the information shown on the indicating device in good time and can use it to successfully bring the key into the stationary position.

In order to be able to indicate the information in the form of text in the language of the user or in pictorial form, an indicating device is preferably a monitor.

In particular the indicating device may include a multi-function indicating instrument. While driving, the multi-function indicating instrument can be used to display other information such as speed, engine revolutions etc., which at the moment of switch-off is no longer needed, so that an indication of information pertaining to movement of the key or the locking cylinder along the path the key movement can be substituted therefor. Since an indicating instrument can be used, which is provided in a prominent place in the vehicle, it is ensured that the driver will reliably perceive the information.

Moving the locking cylinder from the driving position into the stationary position should include a first rotation to the point of directional change and a translation in direction of the axis of the first rotation. This can be followed by a second rotation in direction of the stationary position.

The locking cylinder can be impacted by a spring against the direction of translation. This ensures that the probability of forces accidentally impacting the key thereby initiating the translation, are reliably minimized. On the other hand, a spring impact against the translation direction is not effective in order to inadvertently bring the locking cylinder into the driving position.

The switch may be designed in such a way that the presence of the locking cylinder at the point of directional change is sufficient for operating the switch. In the simplest case, the switch is constructed analogously to conventionally existing switches controlling the electrical components of the vehicle. In particular, various contact fields may be arranged on a common surface, and contacts complementary to the contact fields are movably coupled to the locking cylinder on the surface between a position touching the contact field and a position separated from the contact field.

In a preferred embodiment, the presence of the locking cylinder at the point of directional change is not enough in order to operate the switch; rather the switch is operable by a torque applied to the locking cylinder at the point of directional change.

In order to avoid that a driver familiar with the ignition lock is notified by the hint on the indication the device every time the vehicle is switched off, a control unit may be adapted to function as a time switch member, which activates the indicating device only if the switch is continuously operated during a predefined time interval. If a driver familiar with the function of the ignition lock quickly moves the locking cylinder past the point of directional change thus operating the switch for a short time only, the indicating device remains inactive.

Similarly, a control unit may be provided, which activates the indicating device if the switch is repeatedly operated during a predefined time interval, in particular if a driver, who assuming that the ignition lock is a conventional lock, repeatedly turns the key back and forth in his attempt to reach the stationary position.

In order to mark the point of directional change, two stages extending in axial direction may be provided, of which one is movable with the locking cylinder, and where both meet up at the point of directional change. The other stage may be immovable or movable only to a limited extent in comparison to the first stage. For this reason at least part of the switch may be conveniently provided on the other stage. The other stage may be part of a transfer body, which extends annularly around the locking cylinder. If there is no space for the switch directly on the stages, it may be arranged at any point of the circumference of the transfer body between the same and a vehicle-fixed holder of the ignition lock.

BRIEF DESCRIPTION OF THE DRAWINGS

The present disclosure will hereinafter be described in conjunction with the following drawing figures, wherein like numerals denote like elements.

FIG. 3 shows a section through an ignition lock according to a second embodiment of the present disclosure;

FIG. 4 shows a section analogous to FIG. 3 according to a third embodiment; and

FIG. 5 shows a section according to a fourth embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
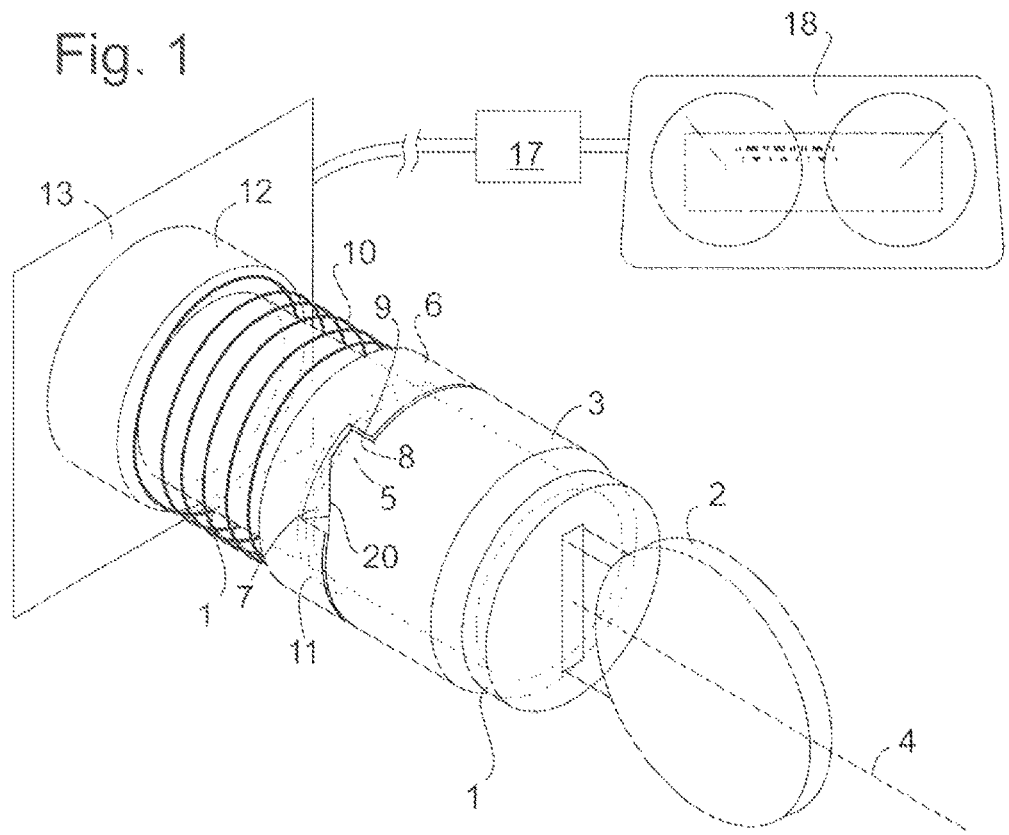
FIG. 1 shows a schematic view of an ignition lock according a first embodiment of the present disclosure.

FIG. 1, in a generalized schematic view, shows a locking cylinder 1 of an ignition lock with a key 2 in the lock. The locking cylinder 1 is surrounded by a sleeve 3 fixedly mounted in the dashboard of a motor vehicle. The locking cylinder 1 is movable in the sleeve 3 in direction of a longitudinal axis 4 and clockwise rotatable about the longitudinal axis 4. A rotation of the locking cylinder 1 in clockwise direction into a driving position is possible out of the shown position, a rotation in anti-clockwise direction is blocked, because a blocking cam 5 at an inner end face of the sleeve 3 engages in a recess 7 of second sleeve 6, which is non-rotatably connected to the locking cylinder 1, and two stages 8, 9 of sleeves 3, 6 extending in axial direction are in contact with each other.

A helical spring 10 holds the sleeve 6 pressed against the inner end face of the sleeve 3 and a projecting stop 11 of the locking cylinder 1, which is hidden inside the sleeves 3, 6. When the locking cylinder 1 is pressed in direction of the longitudinal axis 4, the projecting stop 11 takes the sleeve 6 with it and in doing so compresses the helical spring 10. This causes the blocking cam 5 to move out of the recess 7, thereby making it possible for the locking cylinder 1 to be rotated in anti-clockwise direction into a stationary position.

The helical spring 10 is supported against a contact carrier 12, which is non-rotatably but axially movably connected with the locking cylinder 1 and is therefore not taken along, when the locking cylinder 1 is pressed in. The contact carrier 12, on its side facing away from the observer, includes a plurality of contact pins in the known manner that during the course of a rotation of the closing cylinder 1 move past contact fields on the surface 13 of a circuit board, which in FIG. 1 are hidden under the contact carrier 12. Power supply circuits of electrical components of the vehicle are closed in succession during a movement of the closing cylinder 1 from the stationary position into the driving position/opened in succession during a movement of the locking cylinder 1 back into the stationary position.

Figure 2:
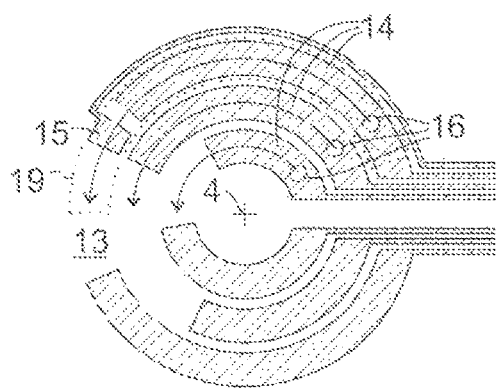
FIG. 2 shows a circuit board with contact fields of the ignition lock of FIG. 1.

FIG. 2 shows a plan view onto contact fields 14, 15 on the surface 13 of the circuit board. The contact fields 14 extend as concentric circular arches around the longitudinal axis 4. Most of these contact fields 14 are elongated and arranged in such a manner that the tips of the contact pins 16 facing the contact fields 14 in FIG. 2, during the movement from the driving into the stationary position, move as indicated by arrows in FIG. 2, on an electrically insulating area of the surface 13. The contact fields 14 extends over merely a very short section of the arch and is placed on the surface 13 in such a way that it is contacted by the associated contact pin 16 at precisely the intermediate position shown in FIG. 1.

Closing a switch 19 formed by the contact field 15 and its associated contact pin 16 via the contact field 15 activates the control unit 17 (see FIG. 1) of an indicating instrument 18 on the dashboard of the vehicle. The indicating instrument 18 may be a monitor, which in driving position indicates the speed of the vehicle, the engine revolutions and/or operating parameters. In the intermediate position the control unit 17 replaces these display values by a hint in the form of a picture or of text, that in order to achieve the stationary position it is necessary to press down on the locking cylinder 1.

When rotating the locking cylinder 1 from the stationary into the driving position, a ramp 20 opposite the stage 8 of the blocking cam 5 glides along the sleeve 6 and in doing so, urges it inwards against the restoring force of the helical spring 10. This rotational movement is therefore not interrupted at the intermediate position and the contact pin 16 moves quickly over and past the contact field 15. A certain delay in switching by the control unit 17 is therefore enough in order to suppress the display of the hint which in this case is superfluous. Also during retracting the locking cylinder 1 into the stationary position provision may be made for the switch 19 formed by the contact field 15 and the pin 16 to be kept closed for a predefined timespan, before the hint is displayed. A experienced user who knows that he has to press down on the locking cylinder and therefore passes through the intermediate position in a shorter time, does not have the hint displayed, but an inexperienced user who holds the locking cylinder in the intermediate position because he believes to be able to rotate it straight into the stationary position, would have it displayed.

The control unit 17 may further be configured to display the hint, even if the switch 19 is repeatedly closed within a second predefined timespan. In this case the hint will also be displayed to a user, who, in the attempt to overcome a suspected blockade of the ignition lock, turns the key 2 back and forth.

FIG. 3 shows a schematic section through the ignition lock along a plane extending perpendicularly to the axis 4 through the blocking cam 5, according to a second embodiment of the present disclosure. Here the contact field and the associated contact pin are replaced by a switch 21, which includes two switching contacts 22, 23 on the shoulder 8 of the blocking cam 8 connected to the control unit 17 and a conductive platelet 24 on the shoulder 9 of the sleeve 6.

When rotating the locking cylinder 1 from the driving position into the intermediate position, the shoulders 8, 9 are pressed against each other and the switch 21 closes and the control unit 17 is activated in order to output the hint. When rotating the locking cylinder 1 from the stationary into the driving position the shoulders 8, 9 do not make contact and the switch 21 remains open.

According to a variant shown in FIG. 4, one of the two switching contacts 22 is held by a spring 25 in a position, in which it projects past the other switching contact 23. To close the switch 21 the spring 25 has to be compressed to the extent, where the platelet 24 also contacts the other switching contact 23. A driver, who expects to be able to bring the locking cylinder 1 into the stationary position by a simple rotation, supplies the necessary force and therefore has the hint displayed to him. A driver who knows that he has to press down on the locking cylinder 1 and does so, does not have the hint displayed to him.

FIG. 5 shows a section through the ignition lock along a plane extending perpendicularly to the axis through the sleeve 3, according to a further variant. The sleeve 3 here is anchored in a holder 26 in that a radial projection 27 of the sleeve 3 engages in a recess of the holder 26. When during the attempt to rotate the locking cylinder 1 into the stationary position the shoulders 8, 9 of sleeves 3, 6 come into contact with each other, the force exercised in the attempt is transferred to the projection 27. A switch 29 on a flank of the projection 27 operable by this force can therefore replace the above-described switch 21. Since the switch 28 may be attached at a larger distance from the locking cylinder 1 than the switch 21, it is subject to merely loose marginal condition as regards its constructional form, so that a low-cost standard component can be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An ignition lock for a motor vehicle comprising:
   a first sleeve fixed to the motor vehicle;
   a second sleeve adjacent the first sleeve;
   a locking cylinder received in the first and second sleeves and configured to receive a suitable key within the locking cylinder along a longitudinal axis in a longitudinal direction;
   wherein the locking cylinder is configured to move in the longitudinal direction within the first sleeve and is configured to rotate within the first sleeve in a first direction to a driving position;
   wherein the second sleeve is configured to rotate with the key and to move in the longitudinal direction with the key;
   wherein the locking cylinder is shiftable along a path between the driving position in which the ignition lock enables operation of an engine of the motor vehicle, and a stationary position in which the ignition lock disables operation of the engine, wherein the path includes a point of directional change, wherein the point of directional change includes a change in movement direction from a rotation to a translation in the longitudinal direction;
   wherein the locking cylinder is blocked by the first sleeve from moving to the stationary position prior to the change in movement direction;
   a switch operable by the locking cylinder at the point of directional change; and
   a display activated by the switch to display information pertaining to movement of the locking cylinder along the path.

2. The ignition lock according to claim 1, wherein the first sleeve includes an inner end face with a blocking cam and the second sleeve includes a recess, wherein the blocking cam engages in the recess and is configured to block movement of the locking cylinder to the stationary position.

3. The ignition lock according to claim 2, wherein the display comprises a multi-function display instrument.

4. The ignition lock according to claim 2, further comprising:
   a contact carrier connected with the locking cylinder and configured to move therewith;
   a circuit board disposed adjacent the contact carrier, wherein the contact carrier includes a plurality of contact pins configured to move past contact fields on the circuit board when the locking cylinder is rotated.

5. The ignition lock according to claim 4, further comprising a spring compressed between the second sleeve and the contact carrier, the spring biasing the locking cylinder against translation in the longitudinal direction.

6. The ignition lock according to claim 4, wherein the path comprises a second rotation following the translation.

7. The ignition lock according to claim 6, wherein the contact fields extend as concentric circular arches around longitudinal axis.

8. The ignition lock according to claim 2, further comprising:
   a contact field arranged on a surface adjacent the locking cylinder; and
   a contact complementary to the contact field coupled to the locking cylinder and movable on the surface between a first position contacting the contact field and a second position disconnected from the contact field.

9. The ignition lock according to claim 1, wherein the switch is formed by the contact field and is configured to close when the locking cylinder is at the point of directional change.

10. The ignition lock according to claim 1, further comprising a control unit configured to activate the display, when the switch is continuously operated during a predefined time interval.

11. The ignition lock according to claim 1, further comprising a control unit configured to activate the display when the switch is repeatedly operated during a predefined time interval.

12. The ignition lock according to claim 1, further comprising:
   a blocking cam at an inner end face of the first sleeve; and
   a shoulder on the second sleeve;
   wherein the switch is disposed between the blocking cam and the shoulder.

13. The ignition lock according to claim 12, wherein the second sleeve has a recess adjacent the shoulder into which the blocking cam is received.

14. The ignition lock according to claim 12, wherein the display is configured to display a hint that in order to achieve the stationary position it is necessary to press down on the locking cylinder.

15. The ignition lock according to claim 14, further comprising:
- a holder within which the first sleeve is anchored and which defines a recess; and
- a radial projection on the first sleeve engaged in the recess.

16. An ignition lock for a motor vehicle comprising:
- a first sleeve fixed in a position and including a blocking cam with a shoulder;
- a second sleeve disposed adjacent the first sleeve and defining a recess configured to receive the blocking cam;
- a locking cylinder received in the first and second sleeves and configured to receive a key within the locking cylinder along a longitudinal axis in a longitudinal direction;
- a contact carrier disposed on an opposite side of the second sleeve from the first sleeve, the contact carrier connected with the locking cylinder to move therewith;
- a spring disposed between the second sleeve and the contact carrier;
- a circuit board disposed adjacent the contact carrier, wherein the contact carrier includes a plurality of contact pins configured to move past contact fields on the circuit board when the locking cylinder is rotated;

wherein the locking cylinder is moveable in the longitudinal direction within the first sleeve and is rotatable within the first sleeve in a first direction to a driving position;

wherein the second sleeve is configured to engage the key when received in the locking cylinder and is configured to rotate with the key and to move in the longitudinal direction with the key;

wherein the locking cylinder is configured to be moved by the key through a path between the driving position in which the ignition lock enables operation of an engine of the motor vehicle, and a stationary position in which the ignition lock disables operation of the engine, wherein the path includes a point of directional change, wherein the point of directional change includes a change in movement direction from a rotation in a second direction opposite the first direction to a translation in the longitudinal direction;

wherein the locking cylinder is blocked from moving to the stationary position by the blocking cam prior to the change in movement direction;

a switch configured to close when the locking cylinder is at the point of directional change; and a display activated by the switch to display information pertaining to movement of the locking cylinder along the path.

* * * * *